April 10, 1951  F. W. SEYBOLD  2,548,272
TRANSMISSION
Filed Oct. 11, 1949  7 Sheets-Sheet 3

INVENTOR
Frederick W. Seybold

INVENTOR.
Frederick W. Seybold

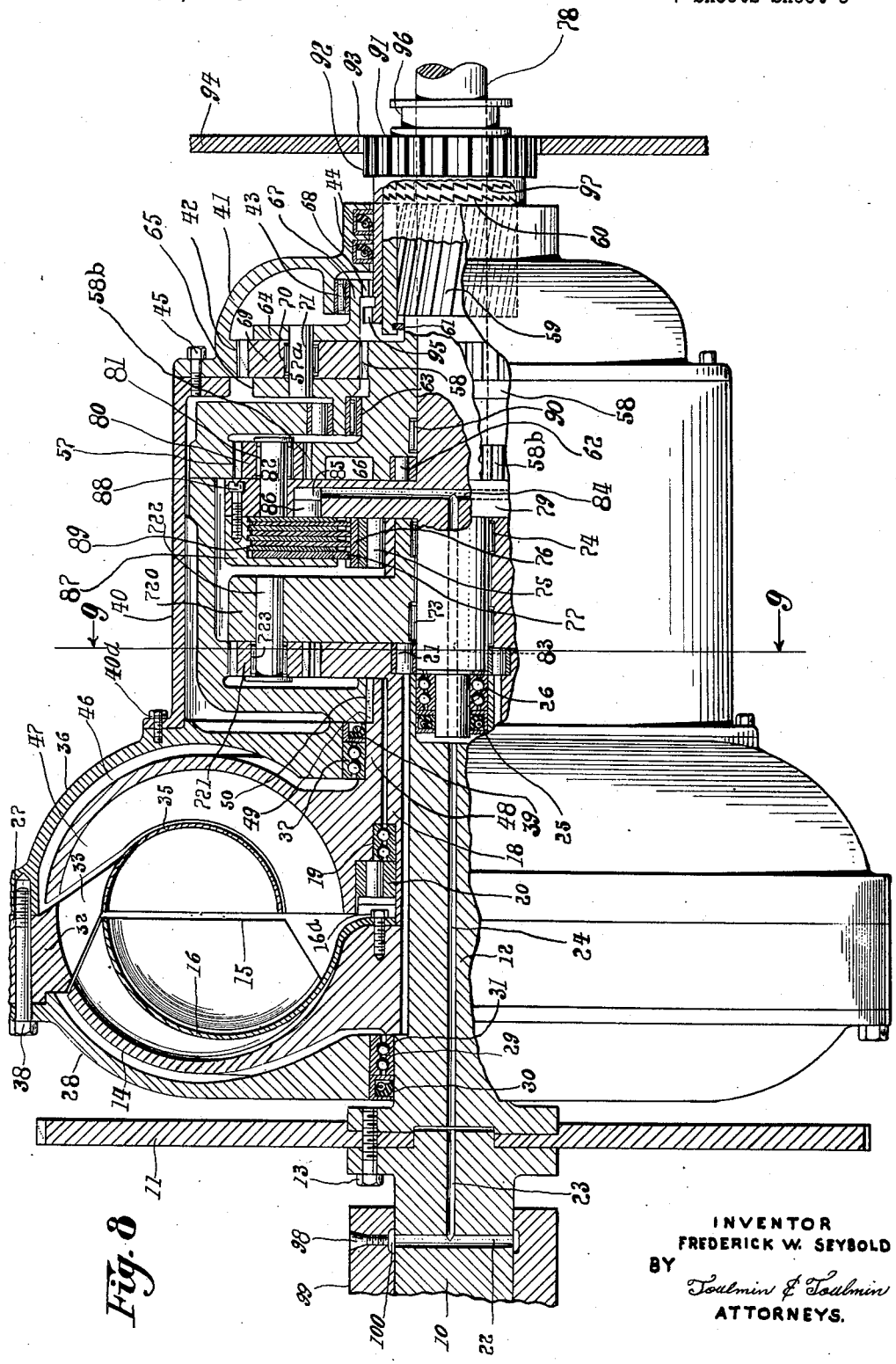

INVENTOR.
Frederick W. Seybold

April 10, 1951  F. W. SEYBOLD  2,548,272
TRANSMISSION
Filed Oct. 11, 1949  7 Sheets-Sheet 7

INVENTOR
FREDERICK W. SEYBOLD
BY
Toulmin & Toulmin
ATTORNEYS.

Patented Apr. 10, 1951

2,548,272

UNITED STATES PATENT OFFICE 2,548,272

TRANSMISSION

Frederick W. Seybold, Westfield, N. J.

Application October 11, 1949, Serial No. 120,649

21 Claims. (Cl. 74—677)

The present invention relates to automatic variable speed power transmissions particularly adapted to transmit power from an internal combustion engine, so designed and constructed to vary the speed and torque ratios between the driving and the driven members of an automobile.

Various automatic transmissions have been devised which combine a Föttinger fluid coupling and planetary gear sets equipped with brakes and clutches which by means of a complex and expensive control mechanism effect thru different combinations of clutch and brake engagements the various driving ratios. These step ratio changes are noticeable to the occupants of the car.

It is an object of this invention to provide a power transmission in which the change-over from one ratio to another is imperceptible.

Another type of automatic transmission employs hydraulic turbine elements to provide torque multiplication, but due to their lower efficiency require additional gear sets for high torque requirements and reverse operation. Their excessive heating requires cooling facilities for the hydraulic fluid. Smoothness of operation, however, has been achieved in this type of transmission.

It is therefore another object of this invention to provide an automatic transmission which does not require a separate gear set for reverse operation.

A further object of this invention is to provide the means whereby a transmission ratio can be maintained which is most favorable for quick acceleration of the vehicle in traffic or in hill climbing.

A still further object of this invention is the provision of a new and novel design of fluid coupling, one element of which is responsive to the speed and centrifugal force of the hydraulic fluid operating therein.

A further novel feature of the present invention is the provision of means which prevent the vehicle from rolling backward when the transmission is conditioned for forward operation, but in which said means become automatically inoperative in reverse operation of the transmission.

An additional feature is the provision of means which prevent the driven shaft from "overrunning" the drive shaft and by means of which the engine may be started by pushing the car.

This invention includes numerous other novel features of construction whereby to render this transmission eminently practical and superior in operation. Numerous combinations and arrangements beside the types of gearing illustrated can be effected by those skilled in the art.

Three preferred forms, which consist essentially of eight assemblies, are illustrated in the accompanying drawings in which:

Figure 8 is a vertical longitudinal section similar to Figure 1, but showing a modified arrangement of the gear train shown in Figure 3;

As stated before the transmission consists of eight assemblies. An assembly, which consists of several connected parts, so defined comprises a unit that is capable of rotating (or remaining stationary as the case may be) at a different speed from that of all the other assemblies of the transmission under certain controlled conditions.

Figure 1:
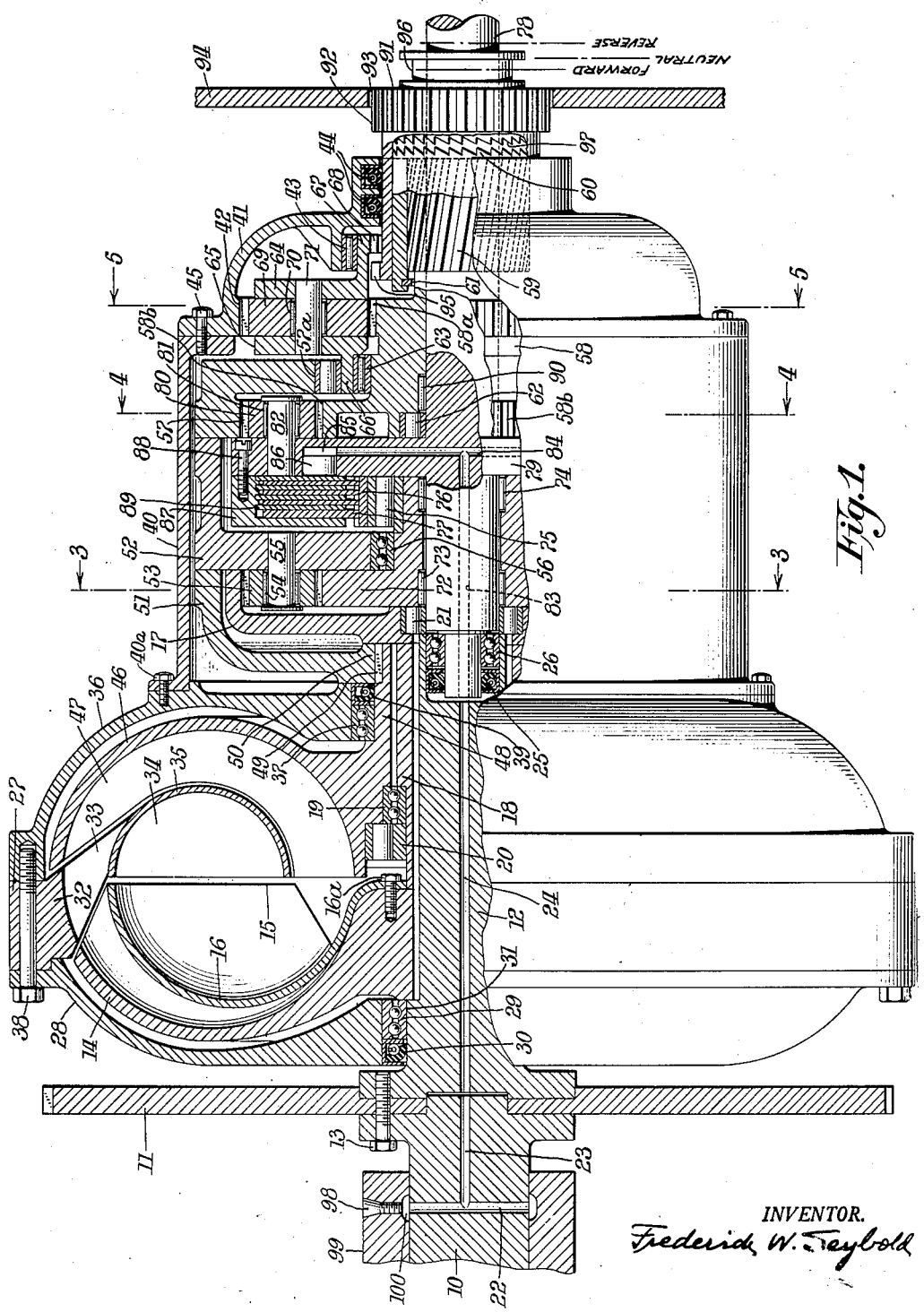
Figure 1 is a vertical longitudinal section thru the power transmission unit.

Referring to the drawings in detail, and in particular to Figure 1 the transmission can best be described by subdividing it into these eight assemblies. Each of these assemblies will now be described fully in detail.

1. THE DRIVING ASSEMBLY

The driving assembly comprises the drive shaft 10 to the flanged end of which is secured the engine starter gear 11 and the long multiple-splined shaft 12 by the bolts 13. To said multiple splines is secured the torus shaped impeller 14 which is provided with radial vanes or partitions 15.

Figure 2:
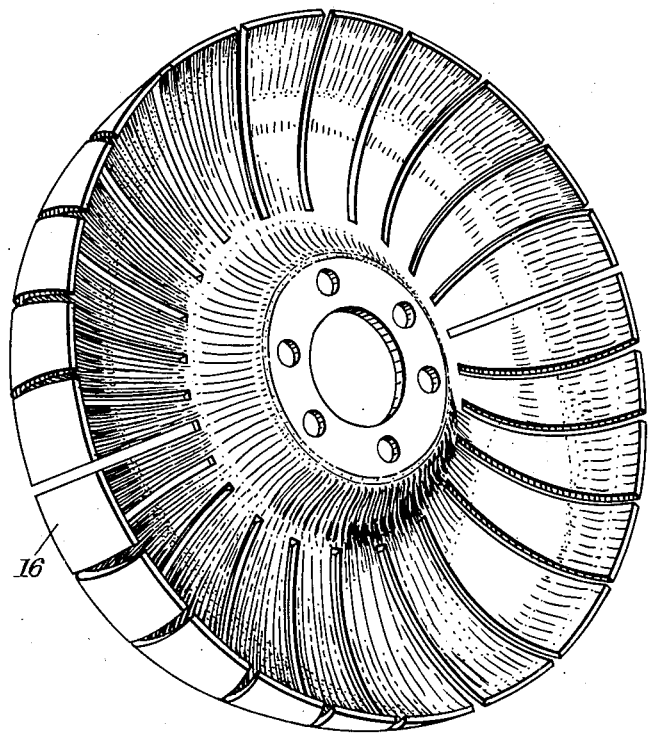
Figure 2 is an isometric drawing of the flexible impeller of the hydraulic coupling.
Figure 3:
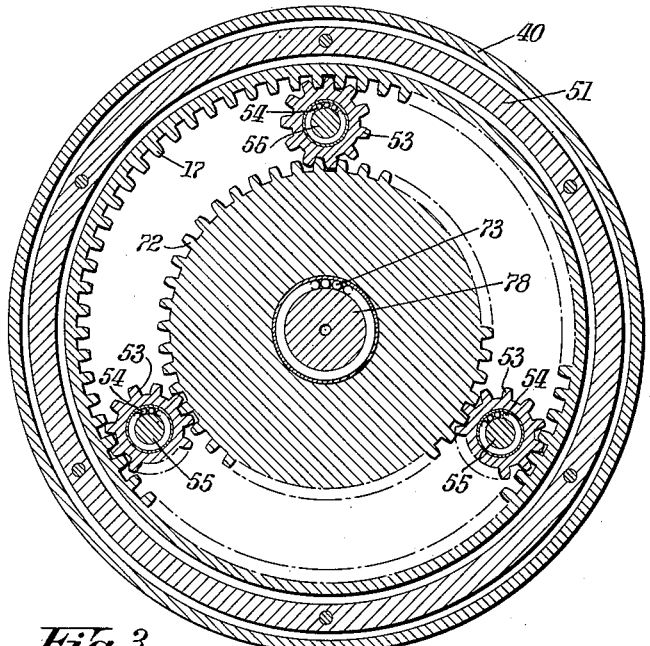
Figure 3 is a transverse sectional view taken along line 3—3 of Figure 1.
Figure 4:
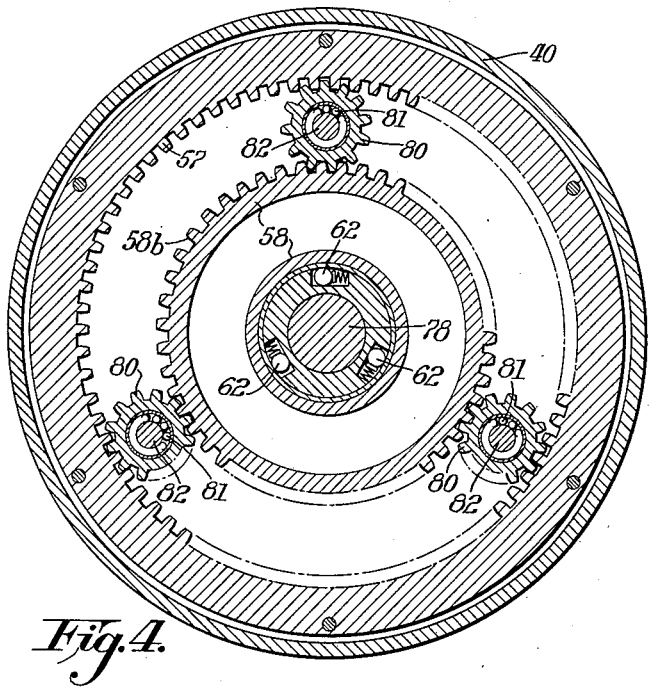
Figure 4 is a transverse sectional view taken along line 4—4 of Figure 1.

A somewhat smaller impeller 16 (see Figure 2) is provided with radial slots into which the vanes 15 project. This impeller is made of spring steel of suitable thickness and strength so that it will flex or yield to the centrifugal force exerted by the circulating oil of the fluid coupling. This impeller 16 is fastened to the impeller 15 by the bolts 16a.

An internal gear 17 provided with a long, multiple splined hub 18 is also secured to the long shaft 12. A ball bearing 19 and one element of an overrunning clutch 20 is carried on the left hand end of the long hub 18. At the extreme right hand end one element of an overrunning clutch 21 is secured.

The drive shaft 10 and the long shaft 12 are provided with oil passages 22, 23 and 24 respectively. The right hand end of the shaft 12 is recessed to receive an oil seal 25 and a ball bearing 26.

2. THE PRIMARY FLOATING ASSEMBLY

The primary floating assembly consists of the multiple section casing 27. The left hand section 28 essentially conforms to the shape of the impeller 14 and is supported on the ball bearing 29 and contains the oil seal 30, both of which operate on the enlarged section 31 of the shaft 12.

The next section 32 consists of the radial vanes 33 and 34, also the torus-shaped shell 35, forming a hydraulic runner which cooperates with the impeller elements 14, 15 and 16.

The third section 36 is shaped to contain the third element of this hydraulic coupling and is supported on the ball bearing 37. The three sections 28, 32 and 36 are bolted together by the screws 38. An oil seal 39 serves to confine the fluid in the coupling and is fitted into the casing 36.

The fourth section 40 is a long flanged shell which is secured to section 36 by the bolts 40a. The last section 41 is provided with an internal gear 42, a needle bearing 43 and oil seals 44 and it is secured to section 40 by the screws 45.

3. THE SECONDARY FLOATING ASSEMBLY

The secondary floating assembly comprises three sections, the first section being the third element of the hydraulic coupling, i. e. the runner 46 to which the radial vanes 47 are attached. The hub 48 of this runner is journalled in the inner race of the ball bearing 37. The right hand end of hub 48 has multiple splines 49 which co-act with the internal spline teeth 50 of the shell 51.

The second section comprises the planet pinion carrier 52 which is secured to the shell 51 by screws not shown. Two or more planet pinions 53 are free to turn on needle bearings 54 on the studs 55 secured in the carrier 52. A ball bearing 56 supports the carrier 52. The other elements of the overrunning clutch 20 are confined in the hub of the runner 46.

The third section comprises the internal gear 57 with one element of an overrunning clutch 57a. This internal gear is fastened to member 52 by screws not shown.

4. THE REACTION ASSEMBLY

The reaction assembly consists of the duplex sun gear 58 which has a hub extending to the right, on the external surface of which are formed righthand multiple helical threads 59, and these are engaged by similar multiple helical threads formed within the bore of the multiple teeth brake 60. The left hand end of member 60 is provided with a stop ring 61 which limits the movement of brake 60 to the right for a purpose to be described later. The outer member of an overrunning clutch 62 is confined in the left hand end of the duplex sun gear 58. A needle bearing 63 is located about midway between the teeth of duplex sun gear 58.

5. THE REVERSE ASSEMBLY

The reverse assembly comprises a two-piece planetary pinion carrier 64 and 65. The left hand section 65 has a hub 66, the outside of which carries one element of the overrunning clutch 57a and on the inside is mounted the outer race of the needle bearing 63. The right hand section 64 also has a hub 67, the outside of which carries the inner race of needle bearing 43, while the bore of the hub is provided with internal brake teeth 68. Planet pinions 69 are journalled on needle bearings 70, the latter being carried on pins 71 which are secured in the carriers 64 and 65. The planet pinions 69 mesh with the internal gear 42 and 58a of the duplex sun gears 58.

6. THE "HIGH GEAR" ASSEMBLY

The "high gear" assembly consists of the sun gear 72 which meshes with the planet pinions 53. The bore of gear 72 is provided with needle bearings 73 and 74. The inner race of ball bearing 56 is also mounted on the long hub of gear 72, as well as the inner member of an overrunning clutch 75, and whose outer member is fitted into the bore of an externally toothed pinion 76, the teeth of which serve to drive the multiple clutch plates 77.

7. THE DRIVEN ASSEMBLY

The driven assembly comprises the driven shaft 78, the left hand end of which is journalled in the ball bearing 26 and co-acts with the oil seal 25. The inside member of the overrunning clutch 21 is also supported on the drive shaft 78 as well as the needle bearings 73 and 74 of the sun gear 72. Integral with the shaft 78 is the planet pinion carrier 79.

Planet pinions 80 are journalled on needle bearings 81, the latter being carried by the headed pins 82 which are secured in the planet pinion carrier 79. Planet pinions 80 mesh with the internal gear 57 and sun gear 58b of the duplex sun gears 58.

A longitudinal oil passage 83 is provided in the shaft 78 which aligns with the oil passage 24 of the driving assembly. Radial oil passages 84 lead from passage 83 to the small cylinders 85 in the carrier body 79. Small pistons 86 are slideably fitted in the cylinders 85 and these pistons respond to oil pressure.

An internally toothed member 87 is fastened by the screws 88 to the carrier 79, whose internal teeth drive the multiple clutch plates 89, which alternate with the clutch plates 77 of the "high gear" assembly. Needle bearings 90 journal the duplex sun gear 58 on the shaft 78.

The inner member of overrunning clutch 62 is integral with driven shaft 78 and this clutch prevents the latter from turning in the reverse direction at a speed greater than that of the duplex sun gear 58, or if this sun gear is locked, the driven shaft 78 is prevented from turning in reverse and this feature is usually referred to as "no-roll-back."

8. THE CONTROL ASSEMBLY

The control assembly comprises the slideable brake member 91, the position of which relative to the brake 60 and internal brake 68 determines the various speed ratios which will be described later. Member 91 is provided with external spline teeth 92 which are slideably mounted in the internal spline teeth 93 of the stationary transmission casing 94. The member 91 extends to the left into the section 41 of the primary floating assembly and thereby provides a cylindrical surface for the oil seals 44 and at its extreme left it is provided with external brake teeth 95 which may be engaged with the internal brake 68 when member 91 is moved to the right by means of well-known shifting mechanisms attached to and operated from the steering wheel column and terminating in the groove 96 of the member 91.

Member 91 is also provided with a bore into which the cylindrical surface of the multiple toothed brake 60 is snugly fitted with only sufficient clearance for an oil film, the reason therefor will be described later. The bore of member 91 terminates with a vertical face on which the multiple teeth 97 are formed for engagement with the brake 60.

As previously mentioned the pistons 86 are actuated by hydraulic oil pressure to condition the multiple friction disc clutch plates 77 and 89 for transmitting power and upon release of this oil pressure the clutch plates will separate and consequently transmit no power.

The source of this hydraulic pressure is usually a pump (not shown) whose high pressure fluid is conducted by pipes to a threaded fitting 98 on bearing 99 in which an annular groove 100 is provided whereby the oil may gain entrance into the ports 22 of the drive shaft 10.

Associated with the control lever and actuated thereby is a valve which controls the flow of pressure oil to the cylinders 85 or permits drainage therefrom.

6a. First substitute "high gear" assembly

Figure 9:
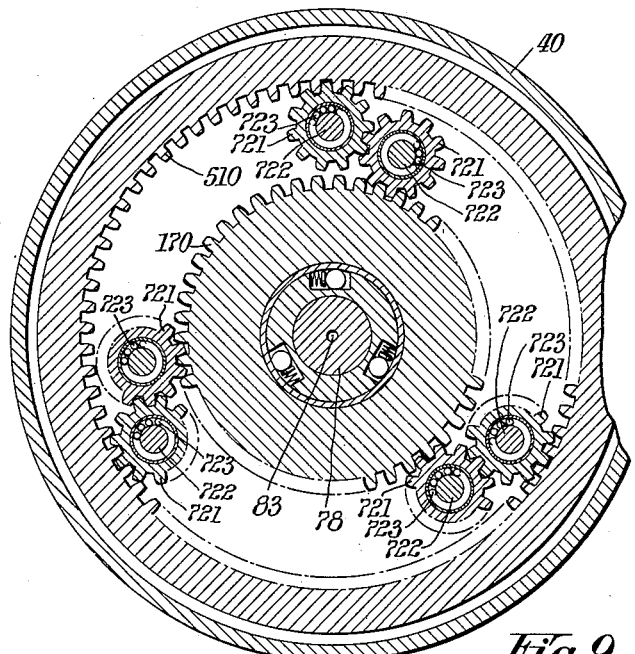
Figure 9 is a transverse sectional view taken along 9—9 of Figure 8.

In Figures 8 and 9 another design of "high gear" assembly is shown. The same reference numerals for parts common with those shown in Figure 1 are used and the new equivalent parts have distinctive reference numerals (reference numeral of Figure 1 multiplied by 10).

The internal gear 17 of the driving assembly of Figure 1 is replaced by a sun gear 170 and the shell 51 of the secondary floating assembly is provided with internal gear teeth 510. The sun gear 72 is replaced by the planet pinion carrier 720 which carries the planet pinions 721 on studs 722 and needle bearings 723.

The bore of carrier 720 is provided with needle bearings 73 and 74, and on its long hub is mounted the inner member of the overrunning clutch 75, and whose outer member is fitted into the externally toothed pinion 76 whose teeth serve to drive the multiple clutch plates 77, which when locked in contact with the plates 89 by means of hydraulic pressure exerted by the pistons 86, transmit power to the driven shaft 78.

6b. Second substitute "high gear" assembly

Figure 11:
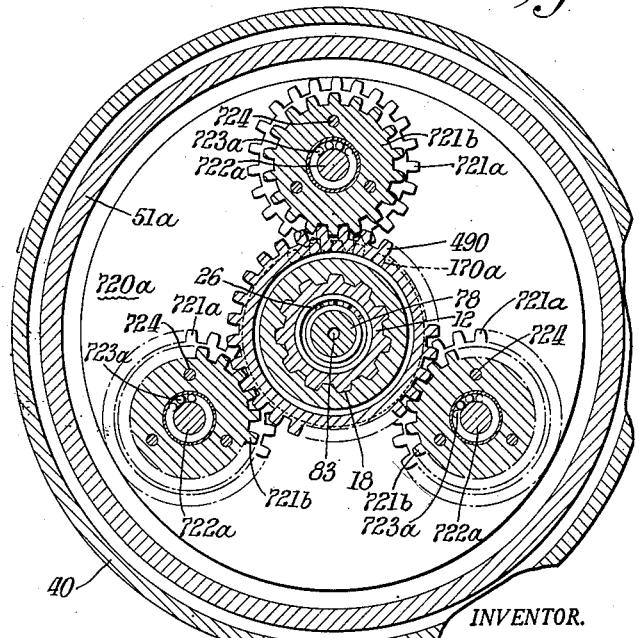
Figure 11 is a transverse sectional view taken along line 11—11 of Figure 10.
Figure 10:
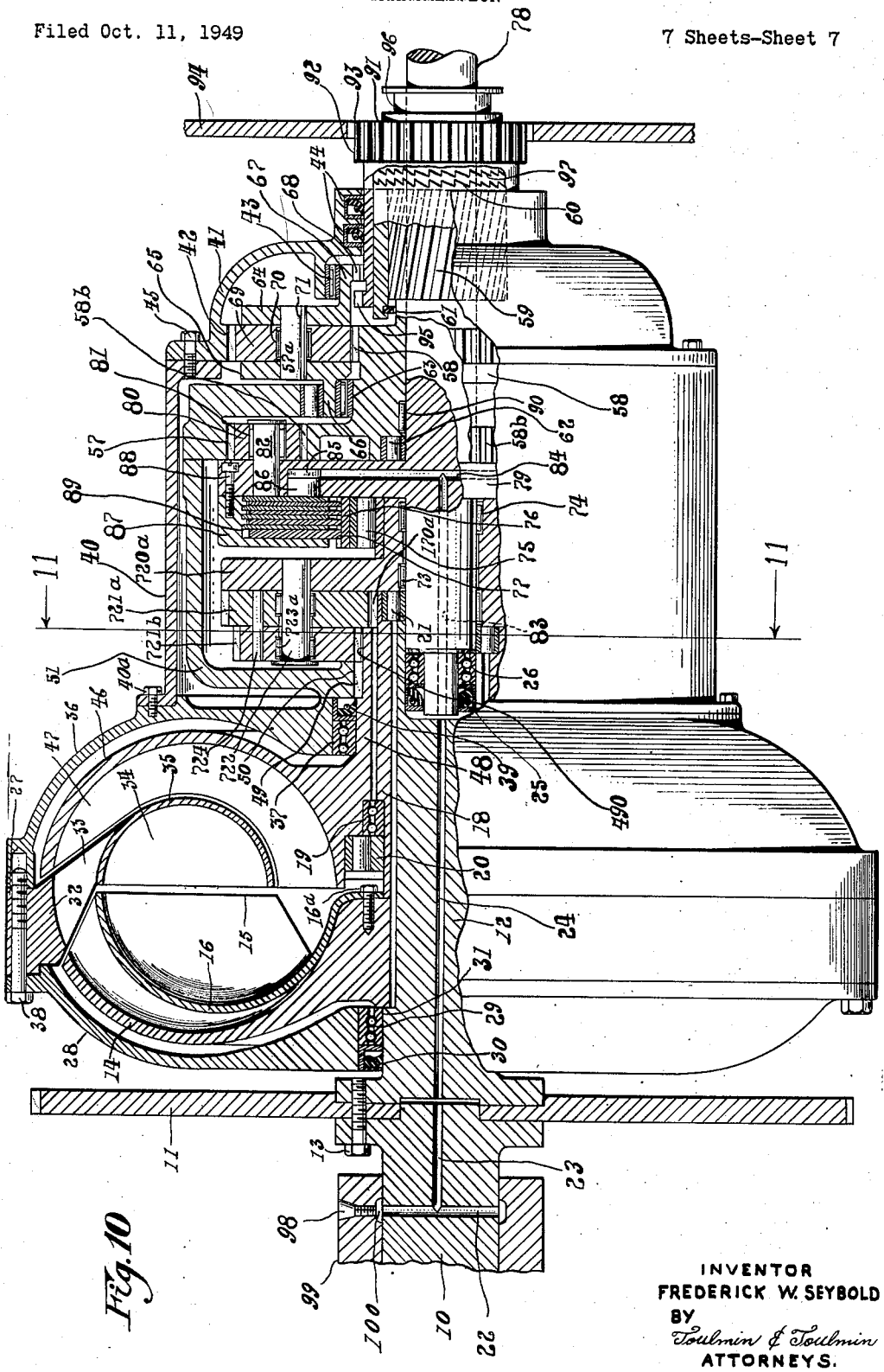
Figure 10 is a vertical longitudinal section similar to Figure 1, but showing still another modified arrangement of the gear train shown in Figure 3.

In Figures 10 and 11 a third design of "high gear" assembly is illustrated. The same reference numerals indicate the parts common with those shown in Figure 1 and the replaced parts have distinctive reference numbers (reference number of Figure 1 multiplied by 10 and a suffix).

The internal gear 17 of the driving assembly of Figure 1 is replaced by the sun gear 17a and the external gear teeth 49 are extended to the right to provide a second sun gear 490.

The sun gear 72 is replaced by the planet pinion carrier 720a which carries the duplex planetary pinions 721a and 721b which are secured to each other by the pins 724. The pinions are provided with needle bearings 723a and are journalled on studs 722a. The driving connection of the carrier 720a is established by means of the overrunning clutch 75 and the multiple plate clutch 77—89 between the carrier 79 of the driven shaft 78 and is identical with that shown in Figures 1 and 8.

OPERATION

A. Idling or "neutral" position

For "neutral" operation of the transmission a suitable control lever on the steering wheel post will be set in the "neutral" position as indicated in Figure 1, thus sliding brake member 91 to the right from the position shown, to the extent that the teeth 97 are out of reach of the brake teeth 60 because the movement to the right of member 60 is limited by the stop ring 61. In this position there is no pressure oil in the cylinders 85 and the clutch plates 77 and 89 are, therefore, in the released condition.

The driven shaft 78 being at rest will compel the reaction assembly, i. e. the duplex sun gear 58 to rotate in the opposite direction from that of the drive shaft and the speed of duplex sun gear 58 is dependent on the number of teeth in the internal gear 56 and the sun gear 58 of this planetary gear train.

For example if the sun gear 58 has 48 teeth and the internal gear 56 has 72 teeth, then the duplex sun gear 58 will rotate 1½ times as fast but in the opposite direction from that of the internal gear 56.

The reverse assembly will also rotate in the same direction as the drive shaft but at a considerably reduced speed which, of course, is desirable for easy engagement of the brake teeth 68 and 95 for "reverse" operation.

If, for example, the internal gear 42 has 72 teeth and the duplex sun gear 58 of this gear train has 30 teeth, then the "reverse" assembly will turn at a speed of $$\frac{72 - 1.5 \times 30}{72 + 30} = \frac{27}{102} = .262$$

times that of the drive shaft 10 approximately, as we may assume that the runners 33—34—35 and 46—47 have very little slip when transmitting no power.

B. Forward operation

For all normal "forward" driving the control lever is shifted to move the control assembly into the position shown in Figure 1, marked FWD, i. e. the slideable member 91 will be shifted to the left to the extent that the brake teeth 97 will now be within reach of the brake teeth 60. Pressure oil will now also be conducted to the cylinders 85 and the clutch plates 77 and 89 become engaged and are capable of transmitting power.

The rotation of duplex sun gear 58 has been halted by the stationary teeth 97. As the speed of impeller 14—15—16 is increased it commences to drive runner 33—34—35 and its connected internal gear 42 whereby the planetary pinion carrier 64, 65 of the "reverse" assembly, referred to previously, is compelled to rotate in the same sense as the drive shaft but at reduced speed and increased torque, due to the duplex sun gear 58 absorbing the reaction torque.

The forward speed of carrier 64, 65 is then (using the same number of teeth as above)

$$\frac{72}{72+30}=.706$$

times that of the internal gear 42.

The torque on carrier 64, 65 has been increased to $$\frac{1}{.706}=1.41$$

times the input torque. This increased torque is transmitted by the overrunning clutch 57a to the internal gear 56 of the secondary floating assembly.

Further torque multiplication takes place due to the reaction torque which is absorbed by the duplex sun gear 58b and this increased torque is delivered to the planetary pinion carrier 79 of the driven assembly, which rotates in the same direction as the drive shaft 10 and at a speed of $$.706 \times \frac{72}{72+48}=.423$$

times the speed of the primary floating assembly.

The driven assembly torque is now $$\frac{1}{.423}=2.36$$

times greater than the input torque. The car, therefore, moves in the lowest gear ratio, the impeller 16 is still rotating at a comparatively low speed and the centrifugal force of the circulating oil is not yet large enough to deflect the curved sections of the impeller 16.

The internal gear 17, which is rotating at drive shaft speed and the planetary pinion carrier 52 which is rotating at a speed of .706 times that of the drive shaft, imparts a speed of only .265 to the sun gear 72, which is less than the speed of the driven shaft 78. The overrunning clutch 75 will permit the driven shaft to turn faster than the sun gear 72.

As the engine speed is increased the centrifugal force of the circulating oil begins to deflect the curved sections of the impeller 16 so that the circulating oil begins to enter the vanes 47 of the runner 46, thereby increasing its speed and its torque capacity, so that the driving power is no longer transmitted thru the gear train 42—69—58a, but thru the gear train 56—80—58b. The duplex sun gear 58 continues to remain stationary and the overrunning clutch 57a permits the entire secondary floating assembly to turn faster than the "reverse" assembly (64, 65).

The transmission is now operating in a different gear ratio, i. e. the speed of shaft 78 is now $$\frac{72}{72+48}=.600$$

times that of the secondary floating assembly and the driven shaft torque is $$\frac{1}{.600}=1.67$$

times the input torque.

It is to be observed, however, that there does not occur a noticeable shock or jerk when this transition from the lower into a higher gear ratio takes place. With a continued increase in speed of the impeller 16 accompanied with further deflection of its curved sections the speed of runner 46 is correspondingly increased and hence also the speed of "high speed" sun gear 72.

With further increase in speed the sun gear 72 will attain a speed equal to the speed of the driven shaft and a still further increase in speed will cause the power to be transmitted directly thru sun gear 72 to the overrunning clutch 75 and clutch plates 77 and 89 to the driven shaft 78.

The power of the engine driving the shaft 10 and impeller 14—15—16 causes the oil to flow thru the vanes 33 into runner 46—47, driving planetary pinion carrier 52. At this point the power is divided, a portion of the total power is delivered to the "high speed" sun gear 72 and hence to the driven shaft 78 as described above. Another portion of the total power is delivered back to the internal gear 17 to augment the power of the engine and hence is "fed back" to the impeller 15—16.

On account of this condition the size of this hydraulic coupling must be somewhat larger than would be required to transmit engine torque alone. It is to be noted again that at the moment when the entire engine power is transmitted thru the "high speed" sun gear 72 directly to the driven shaft again no shock will occur and the transition from the second speed ratio into "high" is not perceptible.

C. Forward motion in "second gear"

When a situation arises where quick acceleration is desirable for passing another car in traffic or for climbing a steep hill the clutch plates 77 and 89 are brought into the disengaged condition by releasing the oil pressure on the pistons 86. As a result, therefore, the transmission continues to operate in the ratio 1.67:1, regardless of the engine speed.

Should the torque become so great that the speed of runner 46 drops to about 70% of the speed of runner 33—34—35 then the power will be transmitted thru the primary floating assembly, i. e. in low gear ratio until torque conditions again permit runner 46 to take over. When it again becomes desirable to return the transmission to the 1:1 ratio oil pressure is again applied to the pistons 86 to condition the clutch plates 77 and 89 to transmit power to the driven shaft 78.

D. Reverse operation

To operate the transmission in reverse, the control lever is shifted to move the control assembly in the position shown on Figure 1, marked "Rev.," thus sliding member 91 to the extreme right, whereby the external brake teeth 95 engage the internal brake teeth 68, arresting the rotation of the reverse assembly (64, 65) in either direction. The brake teeth 97 are now out of reach of the brake teeth 60 of the duplex sun gear 58, previously identified as the reaction assembly.

As mentioned before the reverse assembly (64, 65) is rotating at a speed of only about ¼ of the idling speed of the engine in "neutral" operation, whereby the engagement of brake teeth 60 and 95 is facilitated.

The drive is from the impeller 14—15—16 to the primary floating assembly runner 33—34—35 and internal gear 42, driving the double sun gear 58 of the reaction assembly (58) at a speed of $$72/30=2.4$$

times that of the internal gear 42 in the opposite direction, the planet pinions 69 turning on the stationary pins 71.

The double pinion 58 will cause the internal gear 57 of the secondary floating assembly to rotate $48/72 \times 2.4 = 1.6$ times the speed of internal gear 42, assuming that the output shaft 78 remains stationary. However the overrunning clutch 20 prevents the secondary floating assembly from turning faster than the driving assembly, i. e. $1.0/1.6 \times 2.4 = 1.5$ revolutions of the 2.4 revolutions of double pinion 58 contribute to turn internal gear 56 one revolution, therefore, the remainder of .9 revolution of pinion 58 will compel the output shaft 78 to turn $$\frac{48}{72+48} \times .9 = .360$$

revolution in the reverse direction, and the output torque is $$\frac{1}{.36}$$

or 2.78 times the input torque.

Because the rotational speed of the duplex sun pinion 58 is greater than that of the output or driven shaft 78 the "no-roll-back" device, i. e. the overrunning clutch 62 becomes automatically ineffective during reverse operation of the transmission.

SPEED GRAPH ANALYSIS

Figure 7:
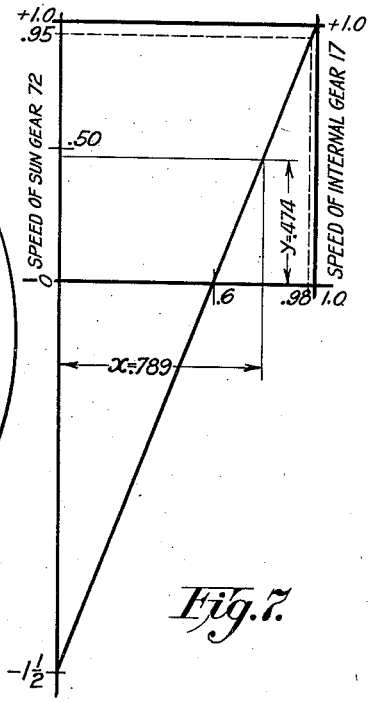
Figure 7 is the speed graph of transmission shown in Figure 1.
Figure 6:
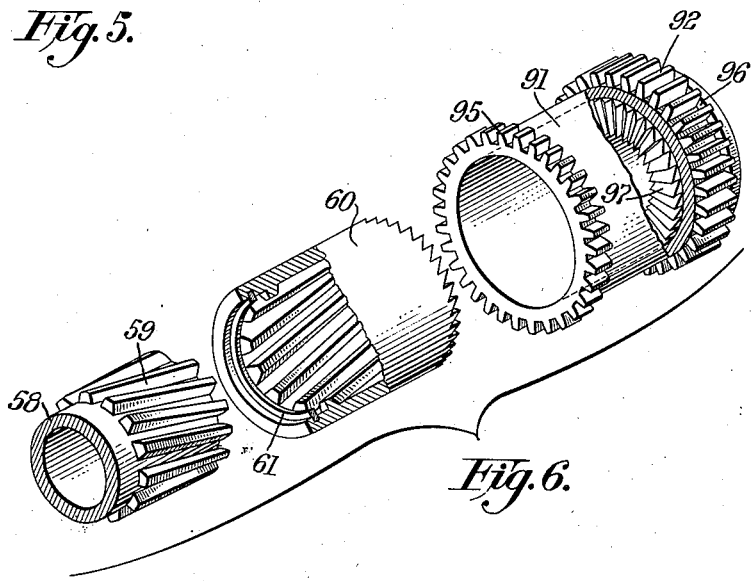
Figure 6 is an exploded view of the reaction brake assembly.

In Figure 7 is shown graphically the relation between the speed of internal gear 17, the pinion carrier 52 and the sun gear 72 of the "high gear" assembly of Figure 1.

For illustration assume that the internal gear 17 has 72 teeth and the sun gear 72 has 48 teeth, then when the carrier 52 is held stationary or zero the sun gear 72 will make 1½ revolutions in the opposite direction from and for each revolution of the internal gear 17.

The sun gear 72 will "take over" the drive of shaft 78 when the speed of the pinion carrier 52, which, of course, is driven by the runner 46, has a value $x$ so that $.6x = y$, where $y$ is the speed of the sun gear 72, because when the gear train 57—80—58b drives the driven shaft 78 the latter will rotate .6 times the speed of the internal gear 57 and carrier 52 which is connected thereto.

From similar triangles we have:

$$3/2:6/10 = y:(x-6/10)$$

1. $.6y = 1.5x - .9$
2. $y = .6x$ from gear train 57—80—58b
   $x = .9/1.14 = .789$
   $y = .474$ In other words whenever the runner 46 exceeds a speed ratio of .789 the driven shaft 78 will begin to be driven by the sun gear 72 thru the overrunning clutch 75 at a speed ratio of .474 times that of the drive shaft 10.

Figure 12:
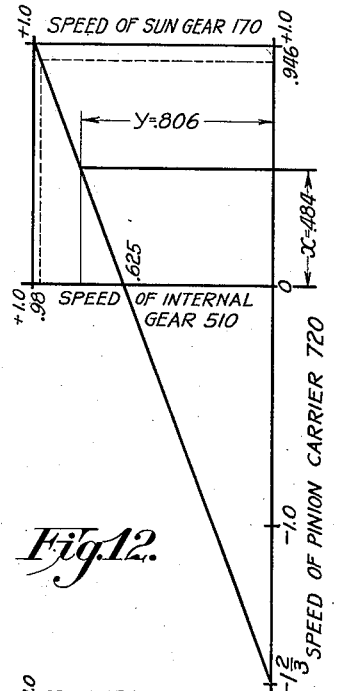
Figure 12 is the speed graph of the transmission when the substitute gear train shown in Figures 8 and 9 is used.

In Figure 12 is shown graphically the relation between the speed of sun gear 170, the internal gear 510 and the pinion carrier 720 of the "high gear" assembly shown in Figures 8 and 9.

For illustration assume that the sun gear 170 has 45 teeth and the internal gear 510 has 72 teeth, then when the internal gear 510 is held stationary or zero the pinion carrier 720 will make 2⅔ revolutions in the opposite direction from and for each revolution of the sun gear 170.

The pinion carrier 720 will "take over" the drive of shaft 78 when the speed of the internal gear 510 which is driven by the runner 46 has attained a speed of value $y$, so that $.6y = x$, where $x$ is the speed of the pinion carrier 720, gear train 57—80—58b is driving the shaft 78 at .6 times the speed of internal gear 57.

From similar triangles we have:

$$1\tfrac{2}{3}x:y = 2\tfrac{2}{3}:1$$

1. $5/3 + x = 8/3y$
2. $x = 6/10y$
   $y = 50/62 = .806$
   $x = .484$

Therefore when the speed of the runner 46 exceeds a speed ratio of .806 the driven shaft 78 will begin to be driven by the pinion carrier 720 thru the overrunning clutch 75 at a speed ratio of .484 times that of the drive shaft 10.

Figure 13:
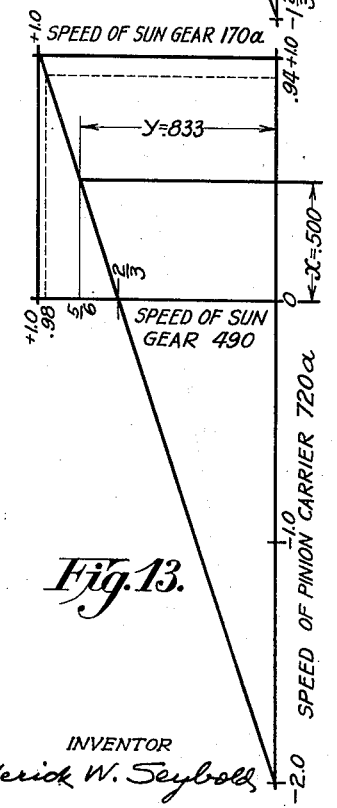
Figure 13 is the speed graph of the transmission when the substitute gear train shown in Figures 10 and 11 is used.
Figure 5:
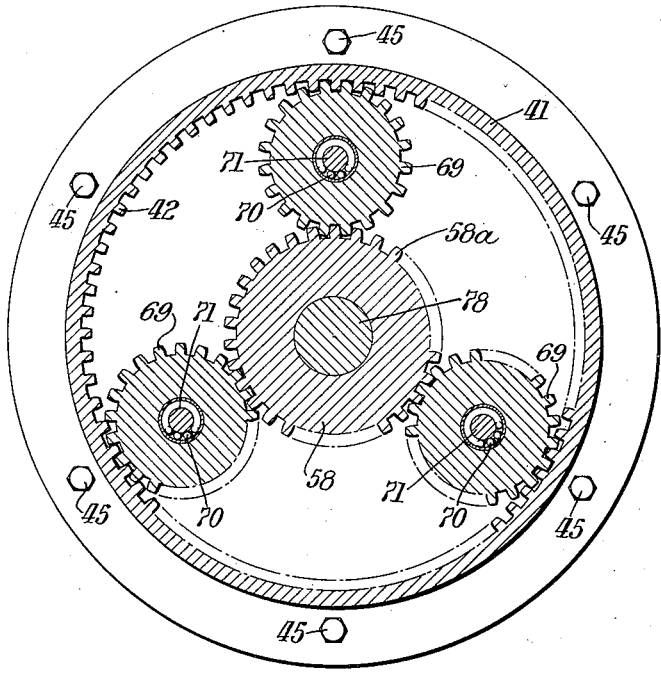
Figure 5 is a transverse sectional view taken along line 5—5 of Figure 1.

In Figure 13 is shown graphically the relation between the speed of the sun gear 170a, the sun gear 490 and the pinion carrier 720a of the "high gear" assembly shown in Figures 10 and 11.

For illustration assume that the sun gear 170a has 25 teeth and the sun gear 490 has 30 teeth and that the compound planetary pinions 721a and 721b have 20 and 25 teeth respectively, so that when the sun gear 490 is held stationary or zero the pinion carrier 720a will make 2 revolutions in the opposite direction from and for each revolution of the sun gear 170a.

The pinion carrier 170a will "take over" the drive of shaft 78 when the speed of the sun gear 490 has attained a speed of value $y$, so that $.6y = x$, where $x$ is the speed of pinion carrier 720a, gear train 57—80—58b is driving the shaft 78 at .6 times the internal gear 57.

From similar triangles we have:

$$2 + x:y = 3:1$$

1. $3y = 2 + x$
2. $.6y = x$
   $y = 2/2.4 = .833$
   $x = .500$

Therefore when the speed of the runner 46 exceeds a speed ratio of .833 the driven shaft 78 will begin to be driven by the pinion carrier 720a thru the overrunning clutch 75 at a speed ratio of .500 times that of the drive shaft 10.

The torque and gear ratios illustrated correspond to those found on present day cars, but it should be understood that these ratios may be varied to suit particular requirements or operating conditions.

The transmission has been described in detail and it is obvious that various modifications, rearrangements or substitutions of mechanical equivalents or minor improvements will suggest themselves to those skilled in the art and as such shall fall within the scope of the following claims.

I claim:

1. A variable speed transmission comprising in combination, a drive shaft, a driven shaft, a reaction member including first and second sun gears mounted for rotation about the axis of the driven shaft, a three element hydraulic coupling composed of an impeller connected to the drive shaft and primary and secondary runners, a stationary brake member, a helically threaded member on the reaction member which cooperates with said stationary brake member upon rotation of the reaction member in one direction to brake the reaction member against rotation, first and second internal gears encircling said sun gears and respectively connected to the runners of said hydraulic coupling, a first planetary pinion carrier attached to the driven shaft having planet pinions thereon meshing with the first sun and internal gears, a second planetary pinion carrier having planet pinions thereon meshing with said second sun and internal gear, and means including a clutch for automatically connecting said second pinion carrier to the first internal gear to drive the driven shaft at reduced speed but increased torque when said reaction member is braked.

2. A variable speed transmission comprising in combination, a drive shaft, a driven shaft, a reaction member including first and second sun gears mounted for rotation about the axis of the driven shaft, a three element hydraulic coupling composed of an impeller connected to the drive shaft and primary and secondary runners, a slideable brake member, a helically threaded member on the reaction member which cooperates with said slideable brake member upon rotation of the reaction member in one direction to brake the reaction member against rotation, first and second internal gears encircling said sun gears and respectively connected to the runners of said hydraulic coupling, a first planetary pinion carrier attached to the driven shaft having planet pinions thereon meshing with the first sun and internal gears, a second planetary pinion carrier having planet pinions thereon meshing with said second sun and internal gears, and means including a clutch for automatically connecting said second pinion carrier to the first internal gear to drive the driven shaft at reduced speed but increased torque when said reaction member is braked.

3. A variable speed transmission comprising in combination, a drive shaft, a driven shaft, a reaction member including first and second sun gears mounted for rotation about the axis of the driven shaft, a three element hydraulic coupling composed of an impeller with a flexible, toroidal shell and primary and secondary runners, a slideable brake member, a helically threaded member on the reaction member which cooperates with said slideable brake member upon rotation of the reaction member in one direction to brake the reaction member against rotation, first and second internal gears encircling said sun gears and respectively connected to the runners of said hydraulic coupling, a first planetary pinion carrier attached to the driven shaft having planet pinions thereon meshing with the first sun and internal gears, a second planetary pinion carrier having planet pinions thereon meshing with said second sun and internal gears, and means including a clutch for automatically connecting said second pinion carrier to the first internal gear to drive the driven shaft at reduced speed but increased torque when said reaction member is braked.

4. A variable speed transmission comprising in combination, a drive shaft, a driven shaft, a reaction member including first and second sun gears mounted for rotation about the axis of the driven shaft, a three element hydraulic coupling composed of an impeller with a flexible, toroidal shell and primary and secondary runners, a slideable brake member, a helically threaded member on the reaction member which cooperates with said slideable brake member upon rotation of the reaction member in one direction to brake the reaction member against rotation, first and second internal gears encircling said sun gears and respectively connected to the runners of said hydraulic coupling, a first planetary pinion carrier attached to the driven shaft having planet pinions thereon meshing with the first sun and internal gears, a second planetary pinion carrier having planet pinions meshing with the second sun and internal gears, means to drivingly engage said second carrier and the first internal gear in one direction of rotation only, and brake means on said second pinion carrier adapted for engagement with said slidable brake member, whereby the driven shaft rotates in the reverse direction when the brake means of the second pinion carrier is locked to the slideable brake member, while the brake means of the reaction member is in the unlocked condition, and in the forward direction when the brake means of the second carrier is unlocked and the reaction member is braked to the said slidable brake member.

5. A variable speed transmission comprising in combination, a drive shaft, a driven shaft, a reaction member including first and second sun gears, a third sun gear, all sun gears being mounted for rotation about the axis of the driven shaft, a three element hydraulic coupling composed of an impeller with a flexible, toroidal shell and primary and secondary runners, a slideable brake member, a helically threaded member on the reaction member which cooperates with said slidable brake member upon rotation of the reaction member in one direction to brake the reaction member against rotation, first, second and third internal gears encircling said sun gears and respectively connected to the runners and impeller of said hydraulic coupling, a first planetary pinion carrier attached to the driven shaft having planet pinions thereon meshing with the first sun and internal gears, a second planetary pinion carrier having planet pinions meshing with the second sun and internal gears, clutch means for connecting said second carrier to the first internal gear, a third planetary pinion carrier attached to the first internal gear having planet pinions meshing with the third sun and internal gears, and clutch means on said third sun gear for automatically connecting said third sun gear to the driven shaft when the speed of the secondary runner exceeds a predetermined amount.

6. A variable speed transmission comprising in combination, a drive shaft, a driven shaft, a duplex sun gear reaction member mounted for rotation about the axis of the driven shaft, a three element hydraulic coupling composed of an impeller with a flexible, toroidal shell and primary and secondary runners, a slideable brake member, a locking member on said duplex sun gear reaction member, helical threads connecting said locking member and duplex sun gear reaction member whereby rotation of said reaction member in one direction will move said locking member into engagement with said brake member to brake said reaction member against rotation, and rotation of the said reaction member in the opposite direction will move said locking member out of engagement with said brake member to release said reaction member, first and second internal gears encircling said duplex sun gear reaction member and respectively connected to the runners of said hydraulic coupling, a first planetary pinion carrier attached to the driven shaft having planet pinions thereon meshing with one sun gear of the reaction member and the first internal gear; a second planetary pinion carrier having planet pinions meshing with the second sun gear of the reaction member and the second internal gear, a clutch operable to connect said second carrier and a three element planetary gear set including clutch means thereon, the first element of which is connected to the drive shaft, the second element of which is connected to the first internal gear, and the third element of which drives the driven shaft by means of said clutch means when a definite speed ratio between the drive shaft and the first internal gear is attained.

7. A variable speed transmission comprising in combination, a drive shaft, a driven shaft, a duplex sun gear reaction member mounted for rotation about the axis of the driven shaft, a three element hydraulic coupling composed of an impeller with a flexible, toroidal shell and primary and secondary runners, a slidable brake member, a locking member on said duplex sun gear reaction member, helical threads connecting said locking member and duplex sun gear reaction member whereby rotation of said reaction member in one direction will move said locking member into engagement with said brake member to brake said reaction member against rotation, and rotation of the said reaction member in the opposite direction will move said locking member out of engagement with said brake member to release said reaction member, first and second internal gears encircling said duplex sun gear reaction member and respectively connected to the runners of said hydraulic coupling, a first planetary pinion carrier attached to the driven shaft having planet pinions thereon meshing with one sun gear of the reaction member and the first internal gear, a second planetary pinion carrier having planet pinions meshing with the second sun gear of the reaction member and the second internal gear, a clutch to connect the second carrier and the first internal gear, multiple plate clutch means on the driven shaft; and a three element planetary gear set including overrunning clutch means and multiple plate clutch means thereon for cooperation with the clutch means of the driven shaft, the first element of said planetary gear set is connected to the drive shaft, the second element is connected to the first internal gear, and the third element drives the driven shaft through said overrunning clutch means when a definite speed ratio between the drive shaft and the first internal gear is attained and the multiple plate clutch means are locked together.

8. A variable speed transmission comprising in combination, a drive shaft, a driven shaft, a duplex sun gear reaction member mounted for rotation about the axis of the driven shaft, a three element hydraulic coupling composed of an impeller with a flexible, toroidal shell and primary and secondary runners, a slideable brake member, a locking member on said duplex sun gear reaction member, helical threads connecting said locking member and duplex sun gear reaction member whereby rotation of said reaction member in one direction will move said locking member into engagement with said brake member to brake said reaction member against rotation, and rotation of the said reaction member in the opposite direction will move said locking member out of engagement with said brake member to release said reaction member, first and second internal gears encircling said duplex sun gear reaction member and respectively connected to the runners of said hydraulic coupling, a first planetary pinion carrier attached to the driven shaft having planet pinions meshing with one sun gear of the reaction member and the first internal gear, a second planetary pinion carrier having planet pinions meshing with the second sun gear of the reaction member and the second internal gear means including a clutch to connect the second carrier to the first internal gear, hydraulic pressure operated multiple plate clutch means on the driven shaft; and a three element planetary gear set including overrunning clutch means and multiple plate clutch means thereon for cooperation with the clutch means of the driven shaft, the first element of said planetary gear set is connected to the drive shaft, the second element is connected to the first internal gear, and the third element drives the driven shaft through said overrunning clutch means when a predetermined speed ratio between the drive shaft and the first internal gear is attained and the multiple plate clutch means are engaged.

9. A variable speed transmission comprising in combination, a drive shaft, a driven shaft, a duplex sun gear reaction member mounted for rotation about the axis of the driven shaft, a three element hydraulic coupling composed of an impeller with a flexible, toroidal shell connected to the drive shaft and primary and secondary runners, a slideable brake member, a helically grooved member on said reaction member to lock said member to said slideable brake member in one direction of rotation of the reaction member or to release the same in the opposite direction of rotation, first and second internal gears encircling said duplex sun gear reaction member and respectively connected to the runners of said hydraulic coupling, a first planetary pinion carrier attached to the driven shaft having planet pinions meshing with one sun gear of the reaction member and the first internal gear, a second planetary pinion carrier having planet pinions meshing with the second sun gear of the reaction member and the second internal gear, a clutch for automatically connecting said second carrier to the first internal gear, a third internal gear connected to the drive shaft, hydraulic pressure operated multiple plate clutch means on the driven shaft, a third sun gear including overrunning clutch means and multiple plate clutch means thereon for cooperation with the clutch means on the driven shaft, a third planetary pinion carrier connected to the first internal gear having planet pinions meshing with the third sun and internal gears, and said third sun gear drives the driven shaft through the overrunning clutch means when a predetermined speed ratio between the drive shaft and the first internal gear prevails and the multiple plate clutch means are engaged.

10. A variable speed transmission comprising in combination, a drive shaft, a driven shaft, a reaction member including first and second sun gears mounted for rotation about the axis of the driven shaft, a three element hydraulic coupling composed of an impeller with a flexible, toroidal shell connected to the drive shaft and primary and secondary runners, a slideable brake member, a helically grooved member on said reaction member to lock said member to said slideable brake member in one direction of rotation and to release the same in the opposite direction, first and second internal gears encircling said reaction member and respectively connected to the runners of said hydraulic coupling, a first planetary pinion carrier attached to the driven shaft having planet pinions meshing with the first sun and internal gears, a second planetary pinion carrier having planet pinions meshing with the second sun and internal gears, means including a clutch for automatically connecting the second carrier to the first internal gear, hydraulic pressure operated multiple plate clutch means on the driven shaft, a third sun gear connected to the drive shaft, a third internal gear connected to the first internal gear, a third planetary pinion carrier including overrunning clutch means and multiple plate clutch means thereon for cooperation with the clutch means on the driven shaft, said third carrier having planet pinions thereon meshing with the third sun and internal gears to drive the driven shaft thru the overrunning clutch means when a fixed speed ratio between the drive shaft and the first internal gear occurs and the multiple plate clutch means are in driving contact.

11. A variable speed transmission comprising in combination, a drive shaft, a driven shaft, a reaction member including first and second sun gears mounted for rotation about the axis of the driven shaft, a three element hydraulic coupling composed of an impeller with a flexible, toroidal shell connected to the drive shaft and primary and secondary runners, a slideable brake member, a helically grooved member on said reaction member to lock said member to said slideable brake member in one direction of rotation or to release the same in the opposite direction of rotation, first and second internal gears encircling said reaction member and respectively connected to the runners of said hydraulic coupling, a first planetary pinion carrier attached to the driven shaft having planet pinions meshing with the first sun and internal gears, and means including a clutch for automatically connecting a second planetary pinion carrier having planet pinions meshing with the second sun and internal gears, means including a clutch for automatically connecting said second carrier to the first internal gear, hydraulic pressure operated multiple plate clutch means on the driven shaft, a third sun gear connected to the drive shaft, a fourth sun gear connected to the first internal gear, and a third planetary pinion carrier including overruning clutch means and multiple plate clutch means thereon for cooperation with the clutch means of the driven shaft, said third carrier having compound pinions thereon meshing with the third and fourth sun gears to drive the driven shaft thru the overrunning clutch means when a fixed speed ratio between the drive shaft and the first internal gear occurs and the multiple plate clutch means are engaged.

12. In a driving arrangement for transmitting uninterrupted torque in combination, a drive shaft, a driven shaft, a fluid flywheel unit composed of an impeller and two turbine elements, said impeller having radial vanes and interposed, flexible, curved fingers, a fluid in said flywheel, three interconnected groups of planetary gearing each having an annulus, sun gear, planet gears connecting the annulus and sun gear, and a carrier for said planet gears, said impeller being connected to the annulus of the first group, means on the sun gear of said first group to drive the driven shaft, and the carrier of said first group being connected to one of the turbine elements and the annulus of the second group, a slideable brake means arranged to stop the rotation in one direction of the sun gears of the second and third groups, the carrier of the second group being connected to the driven shaft, the annulus of the third group being connected to the other turbine element, and the carrier of said third group having means for locking it to the slideable brake means, so that the driven shaft may be rotated in either direction depending upon the position of said slideable brake means.

13. In a driving arrangement for transmitting uninterrupted torque in combination, a drive shaft, a driven shaft, a fluid flywheel unit composed of an impeller and two turbine elements, said impeller having radial vanes and interposed, flexible, curved fingers, a fluid in said fluid flywheel, three interconnected groups of planetary gearing, each having an annulus, sun gear, planet gears and a carrier for said planet gears, said impeller being connected to the sun gear of the first group, means on the carrier of said first group to drive the driven shaft and the annulus of the first group being connected to one of the turbine elements and the annulus of the second group, a slideable brake means arranged to stop the rotation in one direction of the sun gears of the second and third groups, the carrier of the second group being connected to the driven shaft, the annulus of the third group being connected to the other turbine element, overrunning clutch means connecting the carrier of the third group and the annulus of the second group, and means for locking the said carrier of the third group to the slideable brake means, so that the driven shaft may be rotated in either direction depending upon the position of said slideable brake means.

14. In a variable speed transmission, a fluid coupling having a driven impeller and first and second runners, means in the coupling substantially preventing transmission of torque to said second runner until the speed of the impeller exceeds a predetermined amount, a driven shaft, first and second driving connections between said first and second runners, respectively, and said shaft, said connections each including a planetary gear set having a sun gear, said sun gears being integral to form a common reaction member for said gear sets, the second said connection having a higher ratio than the first thereof, and overrunning clutch means in at least one of said connections, and means for selectively locking the reaction member against rotation in one direction for forward operation of said driven shaft or for releasing the reaction member for interrupting the supply of power to the driven shaft.

15. In a variable speed transmission for connecting a drive shaft and a driven shaft, a fluid coupling having an impeller connected with the drive shaft and also having first and second runners, means in the coupling preventing any substantial transmission of torque to said second runner until the speed of the impeller exceeds a predetermined amount, a first planetary gear set having an internal gear connected with said first runner, a second planetary gear set having an internal gear connected with the second runner, a compound sun gear having a sun gear part for each said planetary gear sets, a first planetary pinion carrier having planet pinions meshing with said first internal gear and its sun gear and having a connection with the second internal gear, a second planetary pinion carrier connected with the driven shaft and having pinions thereon meshing with said second internal gear and its sun gear, means for locking said compound sun gear against rotation, and an overrunning clutch in the connection between said first planetary carrier and said second internal gear.

16. In a variable speed transmission for connecting a drive shaft with a driven shaft, a fluid coupling having an impeller connected with the drive shaft and having first and second runners, means on the impeller whereby it transmits driving torque to only the first runner below a predetermined speed and to the second runner above the said predetermined speed, first and second planetary gear sets having internal gears connected with the first and second runners, respectively, a compound sun gear for said gear sets, planet pinions for said first gear set meshing with the internal and sun gears thereof and a carrier for the said pinions, an overrunning clutch connecting said carrier with the internal gear of said second gear set, planet pinions for the second gear set meshing with the internal and sun gears thereof and a carrier therefor connected with the driven shaft, and means for selectively locking said compound sun gear against rotation for rotation of the driven shaft in one direction, for locking the carrier for the planet pinions of the first gear set against rotation for rotation of the driven shaft in the opposite direction, and for releasing both the compound sun gear and the said carrier for interrupting the supply of power to the driven shaft.

17. A compound torque multiplying mechanism in combination, co-axial drive and driven shafts, a three element hydraulic coupling composed of an impeller connected to the drive shaft, and primary and secondary runners, said impeller having radial vanes and a yieldable shell that deflects the pumped oil into the primary runner when the impeller is running below a predetermined speed, a brake member, three interconnected planetary gear units each having rotatable input, output and reaction members, the output member of the first planetary unit being adapted for connection to the driven shaft, the reaction member of the first unit being connected to the drive shaft and the input member thereof being connected to the secondary runner, the output member of the second planetary unit being connected to the driven shaft for driving said driven shaft in the intermediate speed ratio, the input member of the second unit being connected to the secondary runner, an overrunning clutch connecting the output member of the third planetary unit to the input member of the second planetary unit, the reaction member of the third unit being integral with the reaction member of the second unit, the input member of the third unit being connected with the primary runner of the hydraulic coupling, and means for selectively engaging the reaction member of the second and third units with said brake to stop the reaction member against rotation in one direction.

18. A compound torque multiplying mechanism having in combination, co-axial drive and driven shafts, a hydraulic impeller on the drive shaft having radial vanes, primary and secondary runners, a yieldable shell on the impeller coupling it with only the primary runner below a predetermined speed and yielding to couple it with the secondary runner above the said speed, three planetary gear units each having rotatable input, output, and reaction members, the reaction members of the second and third units being integral and there being brake means for selectively locking the said integral members against rotation, means connecting the primary runner with the input member of the third unit and an overruning clutch connecting the output member of the third unit with the input member of the second unit, means connecting the input members of the second and third units with the secondary runner, means connecting the output member of the second unit with the drive shaft, clutch means for connecting the output member of the third unit with the driven shaft, and a direct connection between the drive shaft and the reaction member of the third unit.

19. A compound torque multiplying mechanism having in combination, co-axial drive and driven shafts, a hydraulic impeller on the drive shaft having radial vanes, primary and secondary runners, a yieldable shell on the impeller coupling it with only the primary runner below a predetermined speed and yielding to couple it with the secondary runner above the said speed, three planetary gear units each having rotatable input, output, and reaction members, the reaction members of the second and third units being integral and there being brake means for selectively locking the said integral members against rotation, means connecting the primary runner with the input member of the third unit and an overrunning clutch connecting the output member of the third unit with the input member of the second unit, means connecting the input members of the second and third units with the secondary runner, means connecting the output member of the second unit with the drive shaft, clutch means for connecting the output member of the third unit with the driven shaft, a direct connection between the drive shaft and the reaction member of the third unit, and an overrunning clutch between the driven shaft and the reaction members of the second and third units to prevent rotation of the driven shaft in a direction opposite to the said members.

20. A variable speed transmission comprising in combination, a drive shaft, a driven shaft, a reaction member including first and second sun gears mounted for rotation about the axis of the driven shaft, means for selectively braking said reaction member against rotation in one direction, first and second internal gears encircling said sun gears, a first planetary pinion carrier attached to the driven shaft having planet pinions thereon meshing with the first sun and internal gears, a second planetary pinion carrier having planet pinions thereon meshing with said second sun and internal gears, means including a clutch for providing a driving connected between said second pinion carrier and the first internal gear in one direction of relative rotation only, to drive the driven shaft at reduced speed but increased torque when said reaction member is braked, means to drive said second internal gear by said drive shaft to drive the driven shaft at low speed when said reaction member is braked, and means to drive said first internal gear by said drive shaft to drive the driven shaft at a higher speed when said reaction member is braked.

21. A variable speed transmission comprising in combination, a drive shaft, a driven shaft, a reaction member including first and second sun gears, a third sun gear, all sun gears being mounted for rotation about the axis of the driven shaft, a three element hydraulic coupling composed of an impeller with a flexible, toroidal shell and primary and secondary runners, first, second and third internal gears encircling said sun gears and repectively connected to the runners and impeller of said hydraulic coupling, a first planetary pinion carrier attached to the driven shaft having planet pinions thereon meshing with the first sun and internal gears, a second planetary pinion carrier having planet pinions meshing with said second sun and internal gears, clutch means for connecting said second carrier to the first internal gear, a third planetary pinion carrier attached to the first internal gear having planet pinions meshing with the third sun and internal gears, clutch means on said third sun gear for automatically connecting said third sun gear to the driven shaft when the speed of the secondary runner exceeds a predetermined amount, and means for selectively locking said reaction member against rotation to establish a drive from the drive shaft to the driven shaft.

FREDERICK W. SEYBOLD.

REFERENCES CITED

The following references are of record in the file of this patent:

UNITED STATES PATENTS

| Number | Name | Date |
|---|---|---|
| 1,904,054 | Kiep | Apr. 18, 1933 |
| 2,292,385 | Lysholm | Aug. 11, 1942 |
| 2,353,905 | Kelley | July 18, 1944 |
| 2,355,427 | Duffield | Aug. 8, 1944 |
| 2,366,063 | Seybold | Dec. 26, 1944 |